United States Patent [19]

Benson

[11] Patent Number: 5,542,208
[45] Date of Patent: Aug. 6, 1996

[54] MOBILE UNIT FOR TREATING SOIL

[76] Inventor: William M. Benson, 3537 Pebble Beach Dr., Martinez, Ga. 30907

[21] Appl. No.: 319,122

[22] Filed: Oct. 7, 1994

Related U.S. Application Data

[63] Continuation-in-part of Ser. No. 177,441, Jan. 5, 1994, Pat. No. 5,433,759.

[51] Int. Cl.$^6$ .................................................. A01G 25/06
[52] U.S. Cl. ................................ 47/1.01; 405/43; 405/37
[58] Field of Search ............................... 405/36, 131, 43, 405/37; 47/1 F, 1.01

[56] References Cited

U.S. PATENT DOCUMENTS

| | | | |
|---|---|---|---|
| 5,115,750 | 5/1992 | White | 172/21 |
| 5,120,158 | 6/1992 | Husu | 405/131 |
| 5,156,741 | 10/1992 | Morrison | 47/1 F |
| 5,219,243 | 6/1993 | McCoy | 405/36 |

FOREIGN PATENT DOCUMENTS

| | | | |
|---|---|---|---|
| 682187 | 8/1979 | U.S.S.R. | 405/36 |

*Primary Examiner*—Henry E. Raduazo
*Attorney, Agent, or Firm*—Harris Beach & Wilcox

[57] ABSTRACT

A treatment system for aerating, cooling and heating or draining a site such as a golf course green or a playing field. A mobile blower can be connected and disconnected with an underground duct network situated under the site through a suitable valving arrangement so that one blower can be used in servicing a number of sites.

9 Claims, 3 Drawing Sheets

MOBILE UNIT FOR TREATING SOIL

This application is a continuation in part of application Ser. No. 08/177,441, entitled Underground System for Treating Soil filed Jan. 5, 1994 and now U.S. Pat. No. 5,433,759.

BACKGROUND OF THE INVENTION

This invention relates to a mobile unit for treating soil and, in particular, to a mobile unit suitable for use on golf course or sportsfield sites for transposing an air handling system from site to site.

The term turf, as herein used, refers to the upper layer of each that is exposed to surrounding ambient. The turf supports the grass that serves as the putting surface on a golf course green or any vegetative surface on sportsfields or the like. The term soil or subsoil refers to one or more layers of material that are situated beneath the turf and may be made up of natural or prepared layers of various constituents such as sand, dirt, gravel, peat moss and mixes thereof containing organic materials and other substances that might promote the growth and well-being of grass.

On many golf courses/sportsfields or the like, it is important to maintain the temperature of the turf and soil within a desired range. Special grasses used in the construction of greens are typically temperature sensitive and, as a consequence, the grass can be harmed if special precautions are not taken to protect it against changes in temperature. One such procedure heretofore involved moving air over the green surface using fans. These fans are relatively large and noisy devices and therefore detract from the game. Constant watering and syringing of the greens has also been employed, however, this procedure is relatively expensive, time consuming, and not wholly satisfactory because watering can increase the potential for disease.

In co-pending applications Ser. No. 08/177,441 entitled Underground System for Treating Soil filed Jan. 5, 1994, and Ser. No. 07/243,294 entitled Underground System for Cooling Soil filed May 17, 1994, there is described an underground system for treating greens/sportsfields and, in particular, greens constructed in accordance with specifications published by the United States Golf Association (USGA). The system involves installing a blower beneath ground adjacent each use site that operates to introduce ambient air into the gravel bed beneath the use site under sufficient pressure to force the air upward through the soil and subsoil layers of the green. The gravel bed serves to evenly distribute the air under the green whereby the entire surface area of the green is treated to both aerate the soil as well as heat and/or cool the grass during weather periods which are out of the ideal range for the turf health. The function of the blower is reversed through means of a four-way valve unit to pull ambient air downwardly through the green soil profile to aerate and remove excess water from the soil profile of the use site when certain climatic conditions prevail.

A use site constructed in accordance with USGA specifications is typically equipped with underground drain systems that includes a duct networking in which a number of perforated feeder pipes are connected into a main distribution or drain. The lines are arranged in a herringbone or grid pattern so that excess water moisture in the soil of the green is collected and carried off to a larger drainage system servicing the golf course. As explained in the noted co-pending applications, the existing drainage network of a USGA green can be utilized in conjunction with an air handling system to provide beneficial treatment to the soil and subsoil of the green. Although use of the existing drainage network considerably reduces the cost of installing an underground treatment system, the cost of installing individual air handling equipment at each use site location can still be relatively high.

SUMMARY OF THE INVENTION

It is therefore an object of the present invention to provide an improved system for treating golf course greens or sportsfields.

It is a still further object of the present invention to provide a mobile unit for servicing a plurality of use sites (such as greens) having air handling equipment that is capable of moving a quantity of air through a under ground pipeline system on a use site to both aerate the soil, cool or heat the grass of the site, or to remove excess water from the site.

Another object of the present invention is to provide a mobile unit that can be easily and quickly connected and disconnected into an existing drain system of a golf course green to aerate the soil, to cool or heat the grass or to remove excess water from the subsoil.

These and other objects of the present invention are attained by a mobile unit having a blower mounted thereon that can be connected and disconnected into a duct network beneath a use site/sportsfield to induce a flow of air upwardly through the soil and subsoil of the use site. The blower is equipped with a four-way reversing valve so that the flow of air moving through the duct network can be reversed to pull air downwardly through the soil profile during certain climatic periods, or to remove excess water from the soil and subsoil when required. dr

BRIEF DESCRIPTION OF THE DRAWINGS

For a better understanding of these and other objects of the present invention, reference will be made to the following detailed description of the invention which is to be read in association with the accompanying drawings, wherein.

DESCRIPTION OF THE INVENTION

Figure 1:
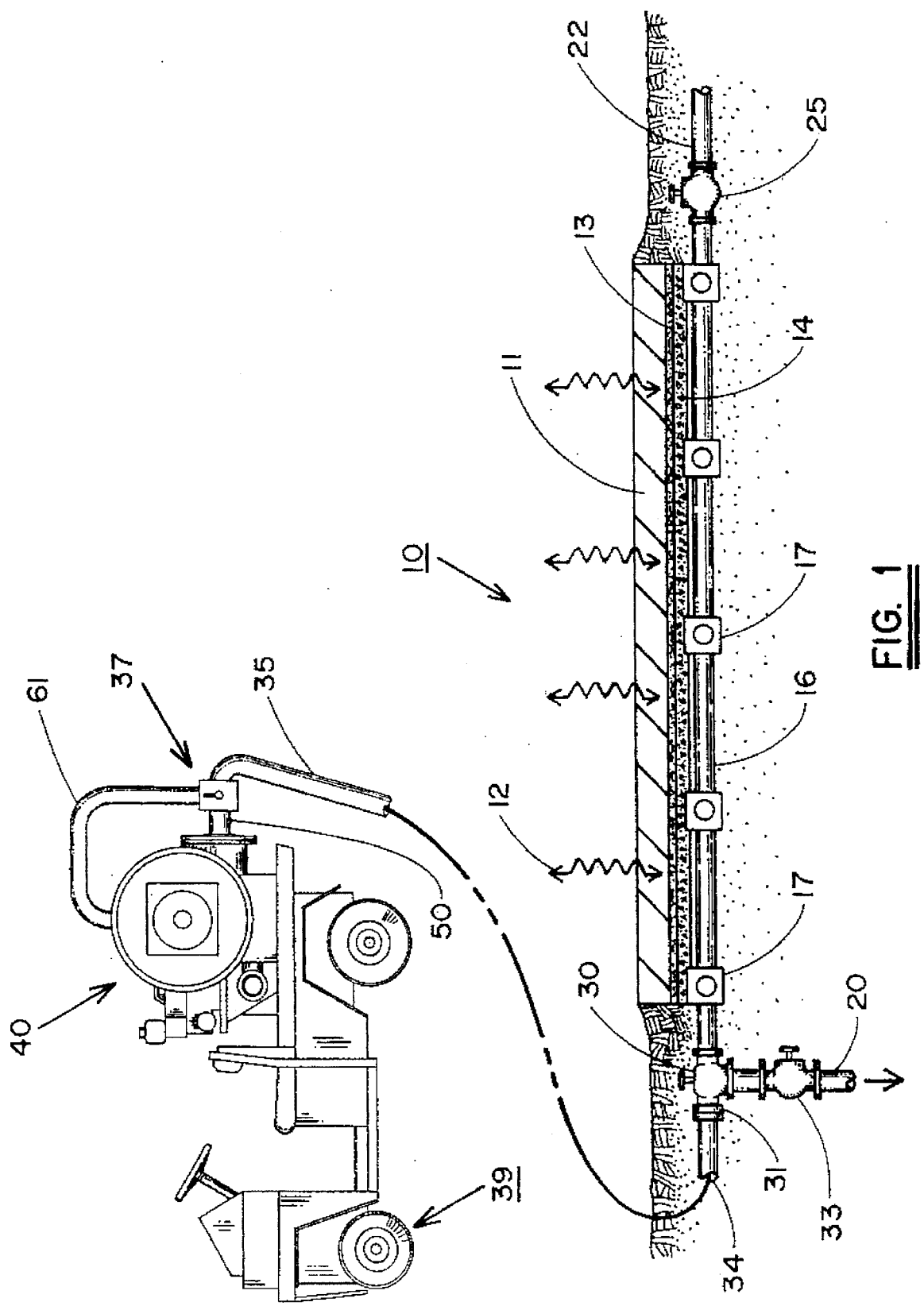
FIG. 1 is a side elevation in section showing a system for treating golf course greens embodying the teachings of the present invention.
Figure 2:
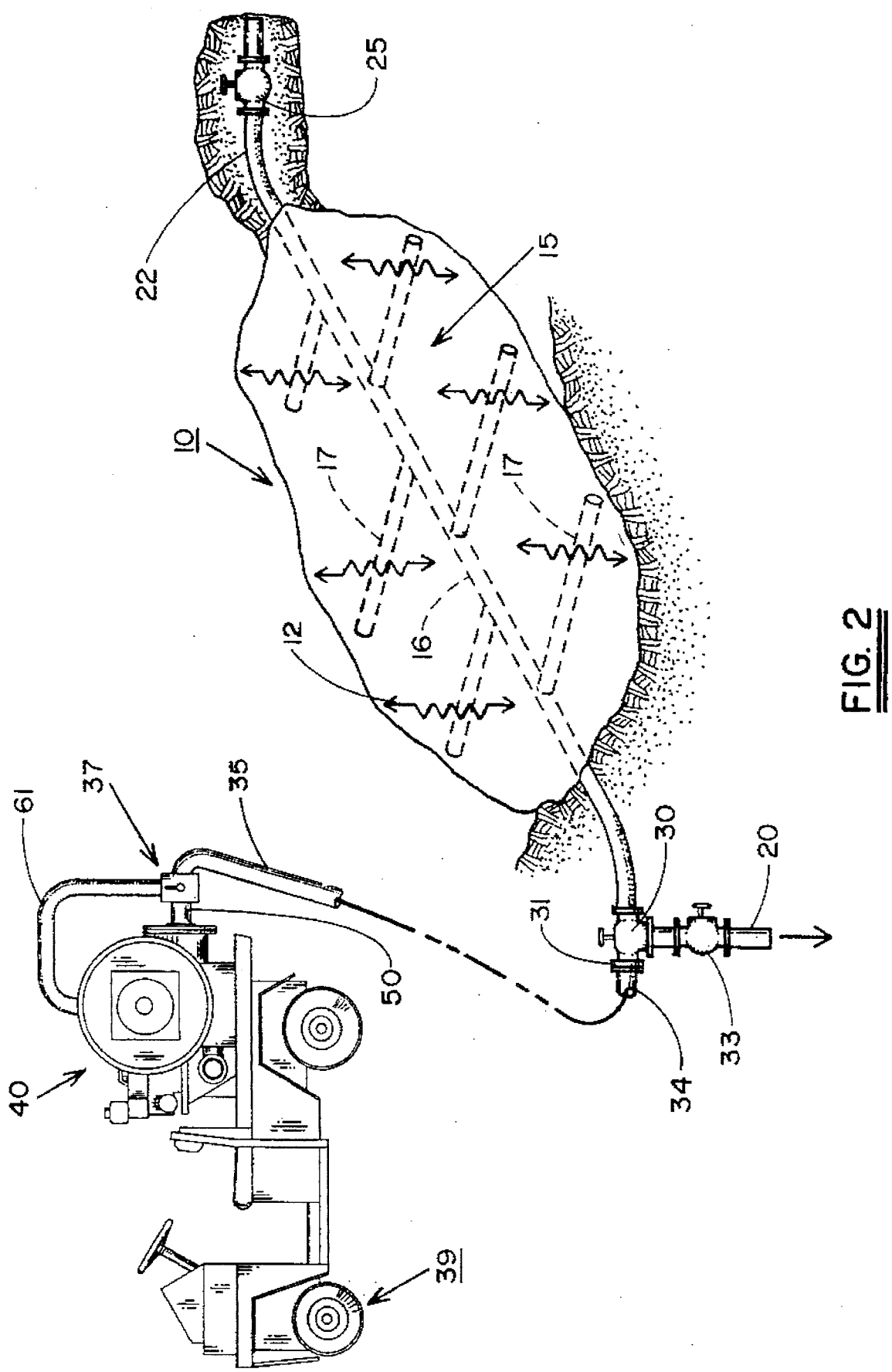
FIG. 2 is a perspective view of the system shown in FIG. 1.

Turning initially to FIGS. 1 and 2, there is shown a golf course green generally referenced 10 that has been constructed in accordance with USGA specifications. Although the invention will be described with specific reference to a golf course green, it should be clear to one skilled in the art that the invention has greater utility and can be used in the treatment of other similar sites such as sports fields. The green includes a top layer of soil 11 that supports the grass forming the putting surface of the green. The top layer of soil is about twelve inches deep and contains a mix of approximately 80% medium sand and 20% organic matter which is typically peat moss. Immediately below the top layer of soil is an intermediate layer 13 that is about two to four inches deep and is made up primarily of coarse choker sand. Finally, there is a bed 14 of ⅜" pea gravel that is at least four inches deep.

Buried beneath the gravel bed is a drain system that includes a duct network generally referenced 15. The network includes a central distribution line 16 from which a series of feeder line 17—17 to service the area of the greens. The lines are perforated and are placed in communication with the gravel bed so that any excess moisture in the bed is collected in the lines. The lines are laid in the ground so that the collected moisture is gravity fed into a drain line 20 which, in turn, carries the moisture to the main drainage system (not shown) servicing the golf course. A clean out line 22 is located at the upper end of the distribution line that permits the duct network to be flushed using high pressure water. A shut-off valve 25 is operatively connected into the clean out line for closing off the upper end of the duct network (22) is also many times simply capped to seal off the flushout.

The lower end of the distributor line is equipped with a two-way valve 30 having a disconnect fitting 31 at one end of the valve outlet. The other outlet of the valve 30 is connected to drain line 20. Downstream from the connection is a shut off valve 33 mounted in the drain line that permits the drain line to be opened or closed.

The disconnect fitting 31 is arranged to receive a quick disconnect coupling 34 that is attached to the downstream end of a flexible supply line 35. The proximal end of line 35, in turn, is connected to a four-way reversing valve unit 37 secured to the discharge side of a blower 40.

The blower 40 is mounted upon the back of a self-propelled vehicle 41 so that it can be transported over the golf course from one green to another. Alternatively, the blower may be mounted upon a trailer that can be moved from green to green by any suitable prime mover. The blower is driven by a gasoline motor that is also mounted on the back of the vehicle and is attached to the driveshaft of the blower. Motive power to the blower may also be furnished by available power take-off/electrical drivers/or high pressure water or fluid driven.

Figure 3:
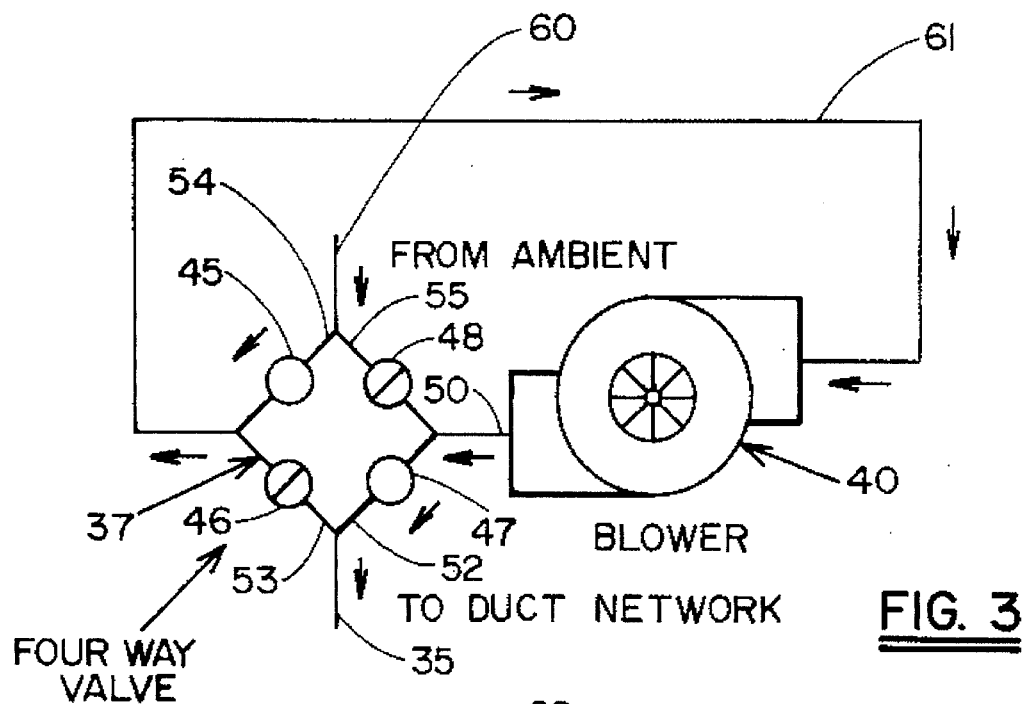
FIG. 3 is a schematic view of the blower and a four-way valve associated therewith positioned to deliver air into the system.
Figure 4:
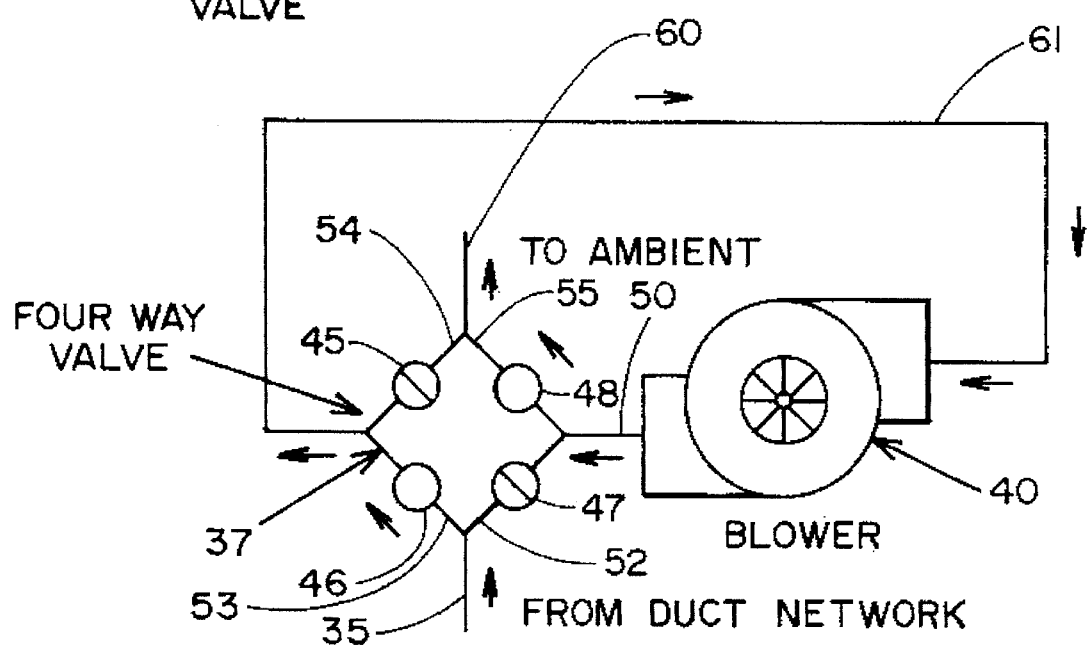
FIG. 4 is a schematic view of the blower and valve shown in FIG. 3 with the valve positioned to draw air out of the system.

Turning now to FIGS. 3 and 4, the four-way flow reversing unit 37 contains four control valves 45–48 mounted in a bridge configuration. The discharge side of the blower is connected to the unit by line 50. One pair of the bridge legs 52,53 is connected to the supply line 35 while the opposite pair of legs 54,55 is attached to an air line 60 that communicates with the surrounding ambient. The exit to the bridge between legs 53 and 54 is connected to the inlet side of blower by means of return line 61.

When valves 46 and 48 are closed and valves 45 and 47 are opened as shown in FIG. 3, ambient air is delivered to the inlet side of the blower and is pumped into the duct network. The air is passed through the lines of the duct network and uniformly distributed throughout the gravel bed 14 beneath the green. The blower delivers low pressure air at a high enough volume such that the air is pushed upwardly through the soil and subsoil of the green back into the surrounding ambient. Air moving upwardly through the green can be used to aerate the soil or to heat and cool the soil.

Reversing the valve positions in the bridge as shown in FIG. 4 places the inlet side of the blower in communication with supply line 35 and the discharge side of the blower in communication with the surrounding ambient. This, in turn, causes ambient air to be drawn downwardly through the green profile. Any excess moisture in the soil accordingly will be pulled into the duct lines and delivered into the drain line 20. The reverse flow arrangement is suitable for use when the ambient temperature is more within the desired range than the ground temperature to provide for cooling or warming of the greens. This vacuum position also allows for the draw down of pesticide vapors to remove them from the user surface.

Preferably, when air is being pumped by the blower into the duct network, valves 33 and 25 will normally be closed and valve 30 opened so that ambient air can pass directly into the gravel bed beneath the green. When the blower is arranged to draw air downwardly through the green, valve 33 will be opened to allow moisture to pass into the drain line. When the quick disconnect coupling is removed, thus separating the blower from the duct network, valve 30 is closed and valve 33 is opened to permit excess moisture collected in the duct network to be gravity fed to the main drain system servicing the course.

As can be seen, one mobile pump can be utilized in the present system to service a number of greens on a golf course/sportsfield and/or leach field. Additionally, existing greens having in place drain systems can be easily retrofitted for almost immediate use in the present air treatment system. The valves servicing the system can be stationed in access pits some distance from the treatment site, and thus will not detract from the field of play.

While this invention has been explained with reference to the structure disclosed herein, it is not confined to the details set forth and this invention is intended to cover any modifications and changes as may come within the scope of the following claims:

What is claimed is:

1. Apparatus for treating the soil of a sportsfield or grass site that includes a duct network buried beneath the soil of a site in a gravel bed, ducts in said network having perforations therein that are in fluid flow communication with said gravel bed, a mobile unit that includes a blower means for supplying air to the duct network at a pressure and volume such that the air is distributed uniformly throughout the bed and is forced upwardly through the soil into the ambient surrounding the site, means for coupling and decoupling the blower to the duct network, and a flow reversing means for reversing the flow of air through said duct network that includes a four-way valve mounted upon the mobile unit for selectively connecting the duct network to either a discharge port on said blower or a suction port on said blower whereby air can be either pushed upwardly through the soil or drawn downwardly through the soil.

2. The apparatus of claim 1 that further includes a drain line coupled to the duct network for draining moisture from the duct network.

3. The apparatus of claim 2 that further includes a first valve means for coupling the drain line to the duct network whereby the drain line can be selectively opened and closed.

4. The apparatus of claim 3 that further includes a second valve means connected to one end of a main distribution line of the duct network for opening and closing the main distribution line and a disconnect means for coupling the blower to said second valve means.

5. The apparatus of claim 4 wherein said first valve means is connected to the second valve means and said second valve means is selectively positionable to connect the distribution line with the blower or the drain line.

6. The apparatus of claim 1 wherein said mobile unit further includes a portable power means connected to said blower for driving the blower.

7. The apparatus of claim 1 wherein said mobile unit is a self-propelled vehicle that is capable of moving between sites.

8. Apparatus for treating the soil of a grass sportsfield that includes a duct network situated beneath the soil of a grass sportsfield in a gravel bed, ducts in said network having perforations therein that are in fluid flow communication with said gravel bed, a drain line coupled to said duct network for draining moisture from the duct network, a mobile unit that includes a blower means having a discharge port for supplying air to the duct network at a pressure and volume such that air is distributed uniformly throughout the bed and is forced upwardly through the soil into the ambient surrounding the grass sportsfield, means for coupling and decoupling the discharge port of the blower to the duct network, and valve means operable for selectively connecting and disconnecting the drain line to said duct network wherein said drain line can be isolated from said duct network when the blower is coupled to the duct network.

9. The apparatus of claim 8 wherein said valve means includes a first valve means for coupling the duct network to the drain line and a second valve means for coupling the blower to the duct network.

* * * * *